May 21, 1957     B. C. STONE     2,792,590

SHRIMP SHELLER

Filed Aug. 9, 1954

Bruce C. Stone
INVENTOR

BY *C. A. Snow & Co.*
ATTORNEYS.

United States Patent Office 2,792,590
Patented May 21, 1957

2,792,590

SHRIMP SHELLER

Bruce C. Stone, Fairmont, W. Va.

Application August 9, 1954, Serial No. 448,663

2 Claims. (Cl. 17—7)

This invention relates to a shelling tool for extracting the body of a shell fish from its natural shell.

It is an object of this invention to provide a culinary tool of the kind to be more particularly described hereinafter which is easy in its use and operation for extracting the eatable body of a shrimp from its shell so that the shrimp may be prepared separate from its shell.

It is another object of this invention to provide a shrimp sheller of this kind by which the eatable body of the shrimp may be easily and readily cut from its crustacean shell by merely spreading apart the shell and cutting the shrimp body therefrom.

Yet another object of this invention is to provide a shrimp sheller of this kind which is formed in its structure for ready use on a shrimp by insertion into the wider end of the shell and then spreading apart the shell so that the body of the shrimp can be easily cut therefrom.

Other and further objects and advantages of the invention will be hereinafter described and the novel features thereof defined in the appended claims.

Figure 1:
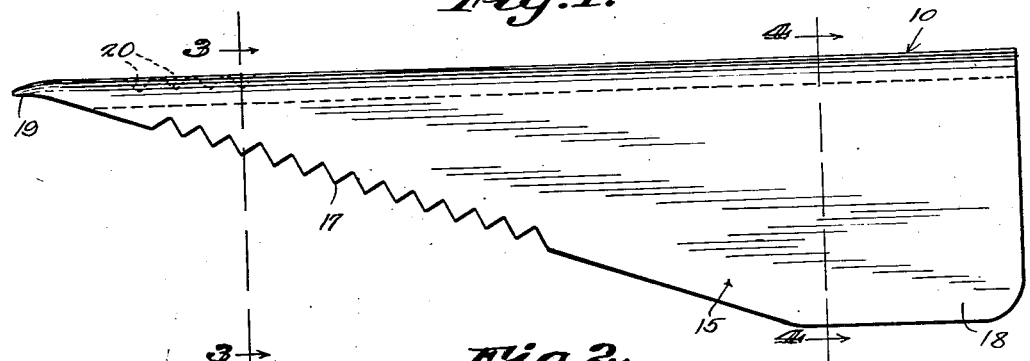
Fig. 1 is a side elevation of a shrimp sheller constructed according to an embodiment of my invention.
Figure 2:
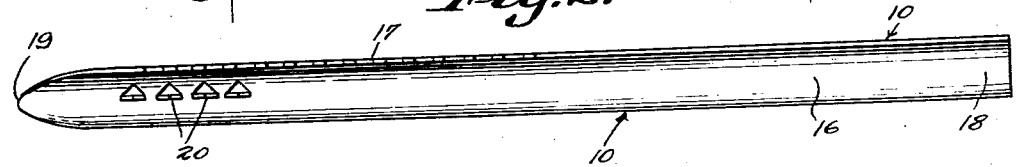
Fig. 2 is a bottom elevation of my invention.
Figure 3:
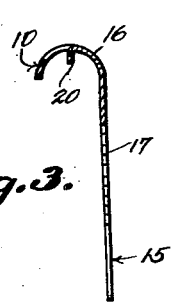
Fig. 3 is a transverse section taken on the line 3—3 of Fig. 1.
Figure 4:
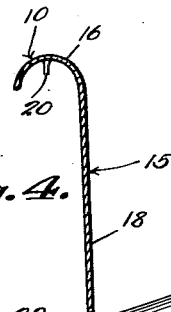
Fig. 4 is a transverse section taken on the line 4—4 of Fig. 1.
Figure 5:
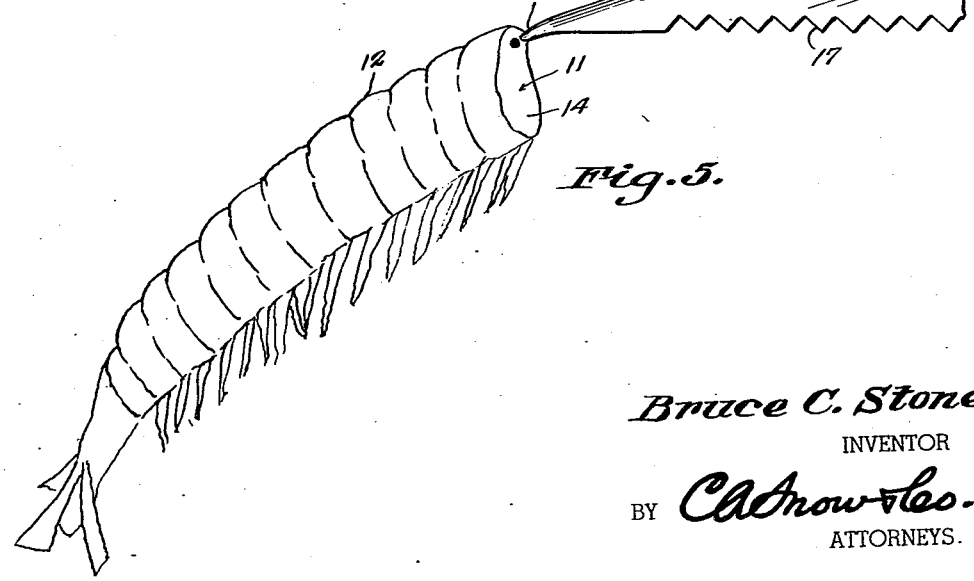
Fig. 5 is a side elevation, partly broken away, of my invention before its application to a shrimp.

In the preparation of shrimp for cooking it has been a problem for shelling the shrimp before the body of the shrimp has been processed for eating and it is a principal object of this invention to provide a shelling device, as a culinary knife or article, for shelling the body of the shrimp from its shell.

Referring to the drawings the numeral 10 designates generally a shrimp sheller or shelling device constructed according to an embodiment of my invention.

The shrimp sheller 10 is adapted to be used on a shrimp 11 for spreading apart and opening the shrimp shell 12 while the shrimp body 14 is removed therefrom.

The shrimp sheller 10 is provided with a substantially triangular body 15 which is adapted to be thrust longitudinally of the shrimp from the wider end of the shrimp shell 12 toward the rear end or tail of a shrimp, meanwhile severing the veins of the body from the shell and other parts of the shrimp body 14 which secure the body of the shrimp to the shrimp shell 12 interiorly thereof.

The shrimp sheller 10 is provided with a concavo convex side edge 16 longitudinally of the substantially triangular body 15, there being a serrated cutting edge 17 on the edge of the substantially triangular body 15 opposite to the concavo convex side edge 16. A substantially rectangular handle 18 is formed at one end of the shrimp sheller 10 at the base of the substantially triangular body 15 there being a point 19 on the blade end of the shrimp sheller 10 the point 19 having tangs 20 interiorly thereof at the front end of the concavo convex side edge 16 as clearly shown in the drawings.

In the use and operation of the shrimp sheller 10, the point 19, which extends downwardly and forwardly of the shrimp sheller is initially inserted into the shrimp between the shrimp body 14 and the shrimp shell 12 to sever any and all connections between the body and shell.

While the specific details of one embodiment of this invention have been herein shown and described, the invention is not confined thereto as changes and alterations may be made without departing from the spirit and scope thereof as defined in the appended claims.

I claim:

1. A shrimp sheller of the kind described, comprising an elongated substantially triangular flat blade insertable into a shrimp to be shelled for severing the body of the shrimp from its shell, one side edge of said blade being curved laterally, adapted to move between the shell and meat of the shrimp, the edges of said blade tapering towards one end of said blade providing a pointed end for insertion into a shrimp, and tangs extending inwardly from said laterally curved portion of said blade adapted to open the body of the meat of the shrimp, as the shell is positioned between the meat and shell of the shrimp.

2. A shrimp shelling device of the kind described, comprising a substantially triangular blade, having a concavo convex portion on one longitudinal side of said blade for insertion longitudinally into a shrimp between its body and shell to spread the shell from the body, a longitudinally extending cutting edge on said blade opposite to said concavo convex portion for severing the body from the shell, the end of the blade at the apex of said blade and juncture of said side edges being formed into a point, and a substantially rectangular handle at the base of said blade remote from the apex thereof, said cutting edge being serrated intermediate the length thereof spaced from said apex, and tangs extending inwardly from said concavo-convex portion.

References Cited in the file of this patent

UNITED STATES PATENTS

| | | |
|---|---|---|
| D. 146,614 | Pelka et al. | Apr. 15, 1947 |
| D. 162,924 | Becherer | Apr. 17, 1951 |
| 598,463 | Foster | Feb. 1, 1898 |
| 669,884 | Stoddard | Mar. 12, 1901 |
| 2,364,250 | Stokes | Dec. 5, 1944 |
| 2,561,359 | Gorton | July 24, 1951 |
| 2,573,601 | Rathmell | Oct. 30, 1951 |